US010325541B2

(12) United States Patent
Hochman et al.

(10) Patent No.: US 10,325,541 B2
(45) Date of Patent: Jun. 18, 2019

(54) LARGE-FORMAT DISPLAY SYSTEMS HAVING COLOR PIXELS AND WHITE PIXELS

(71) Applicant: Revolution Display, LLC, Glendale, CA (US)

(72) Inventors: Jeremy Hochman, Walnut, CA (US); Robbie Thielemans, Nazareth (BE)

(73) Assignee: Production Resource Group, L.L.C., Armonk, NY (US)

( * ) Notice: Subject to any disclaimer, the term of this patent is extended or adjusted under 35 U.S.C. 154(b) by 85 days.

(21) Appl. No.: 14/976,459

(22) Filed: Dec. 21, 2015

(65) Prior Publication Data

US 2016/0180760 A1 Jun. 23, 2016

Related U.S. Application Data

(60) Provisional application No. 62/095,038, filed on Dec. 21, 2014.

(51) Int. Cl.
*G09G 3/20* (2006.01)
*G09G 5/02* (2006.01)
*H04N 9/73* (2006.01)

(52) U.S. Cl.
CPC ......... *G09G 3/2003* (2013.01); *G09G 3/2074* (2013.01); *G09G 5/026* (2013.01);
(Continued)

(58) Field of Classification Search
CPC ............... G09G 3/2003; G09G 3/2074; G09G 2300/0426; G09G 2300/0452; G09G 2320/0233; G09G 2320/0666
(Continued)

(56) References Cited

U.S. PATENT DOCUMENTS 6,097,367 A    8/2000 Kuriwaki et al.
7,081,925 B2   7/2006 Yang et al.
(Continued)

FOREIGN PATENT DOCUMENTS

CN    101860762 A    10/2010
JP      4323386 B2    9/2009
WO   2014083472 A1    6/2014

OTHER PUBLICATIONS

European Partial Search Report dated May 27, 2016, in corresponding EU Patent Application No. 15200782.9, filed on Dec. 17, 2015, in the name of Revolution Display, LLC.
(Continued)

*Primary Examiner* — Kwin Xie
(74) *Attorney, Agent, or Firm* — Downs Rachlin Martin PLLC

(57) ABSTRACT

Large-format display systems having color pixels and white pixels are disclosed. In an embodiment, the system includes a video camera, a video processor, and a large-format display that includes the color pixels and the white pixels. The video processor processes the video signal from the video camera, but the video processor does not perform a white-to-RGB conversion. Instead, the information for the white pixels is sent directly to the large-format display to form the color display image. A viewer's visual system performs the white-to-RGB conversion when viewing the color display image. A method of forming the color display image using color pixels and white pixels is also disclosed. Methods of performing color matching using the color pixels and white pixels are also disclosed.

24 Claims, 5 Drawing Sheets

(52) U.S. Cl.
CPC ....... *H04N 9/73* (2013.01); *G09G 2300/0426* (2013.01); *G09G 2300/0452* (2013.01); *G09G 2320/0233* (2013.01); *G09G 2320/0666* (2013.01); *G09G 2330/023* (2013.01); *G09G 2340/06* (2013.01); *G09G 2370/10* (2013.01); *G09G 2370/12* (2013.01)

(58) Field of Classification Search
USPC .................................................. 345/76–83
See application file for complete search history.

(56) References Cited

U.S. PATENT DOCUMENTS

| | | | |
|---|---|---|---|
| 7,129,634 B2 | 10/2006 | Boroson et al. | |
| 7,176,935 B2 | 2/2007 | Higgins | |
| 7,259,734 B2 | 8/2007 | Lim | |
| 7,414,630 B2 | 8/2008 | Schweng et al. | |
| 7,705,855 B2 | 4/2010 | Brown Elliott | |
| 7,728,846 B2 | 6/2010 | Higgins et al. | |
| 7,986,291 B2 | 7/2011 | Van Mourik et al. | |
| 7,990,393 B2 | 8/2011 | Higgins | |
| 8,248,440 B2 | 8/2012 | Ben-David et al. | |
| 8,390,643 B2 | 3/2013 | Belik et al. | |
| 8,400,480 B2 | 3/2013 | Kim et al. | |
| 8,411,022 B2 | 4/2013 | Brown Elliott et al. | |
| 8,552,636 B2 | 10/2013 | Chaji et al. | |
| 8,599,211 B2 | 12/2013 | Hsieh et al. | |
| 8,723,995 B2 | 5/2014 | Schweng et al. | |
| 8,854,709 B1 | 10/2014 | Liu et al. | |
| 9,165,496 B1* | 10/2015 | Jung | G09G 3/3225 |
| 9,183,798 B2 | 11/2015 | Ishii | |
| 2004/0080938 A1* | 4/2004 | Holman | F21S 8/08 362/231 |
| 2004/0263528 A1* | 12/2004 | Murdoch | G09G 3/3208 345/600 |
| 2005/0083341 A1 | 4/2005 | Higgins et al. | |
| 2005/0270444 A1* | 12/2005 | Miller | G09G 3/3216 349/108 |
| 2006/0187155 A1 | 8/2006 | Chang et al. | |
| 2006/0227085 A1 | 10/2006 | Boldt, Jr. et al. | |
| 2006/0267892 A1 | 11/2006 | Pei et al. | |
| 2006/0268003 A1 | 11/2006 | Tanase et al. | |
| 2007/0139437 A1 | 6/2007 | Boroson et al. | |
| 2007/0159536 A1 | 7/2007 | Lin | |
| 2007/0176862 A1 | 8/2007 | Kurt et al. | |
| 2007/0205423 A1* | 9/2007 | Yamazaki | H01L 27/3213 257/89 |
| 2008/0049048 A1 | 2/2008 | Credelle et al. | |
| 2008/0225143 A1* | 9/2008 | Joffer | G09G 3/2003 348/280 |
| 2008/0252797 A1 | 10/2008 | Hamer et al. | |
| 2009/0073099 A1 | 3/2009 | Yeates et al. | |
| 2009/0085926 A1 | 4/2009 | Kim et al. | |
| 2009/0267879 A1 | 10/2009 | Masuda | |
| 2009/0304361 A1* | 12/2009 | Chan | H04L 27/36 386/357 |
| 2010/0103187 A1 | 4/2010 | Linssen | |
| 2010/0118045 A1* | 5/2010 | Brown Elliott | G02B 27/2214 345/589 |
| 2011/0148910 A1* | 6/2011 | Botzas | G09G 5/02 345/600 |
| 2012/0026339 A1 | 2/2012 | Kojima et al. | |
| 2012/0050567 A1* | 3/2012 | Cote | H04N 9/68 348/224.1 |
| 2013/0093783 A1 | 4/2013 | Sullivan et al. | |
| 2014/0184862 A1 | 7/2014 | Schweng et al. | |
| 2014/0240567 A1 | 8/2014 | Saito et al. | |
| 2014/0285542 A1 | 9/2014 | Izumi et al. | |
| 2014/0293091 A1* | 10/2014 | Rhoads | G01J 3/513 348/234 |
| 2015/0029358 A1 | 1/2015 | Kaizu | |
| 2015/0103212 A1 | 4/2015 | Saito | |
| 2015/0116555 A1 | 4/2015 | Hayashi et al. | |
| 2015/0146067 A1 | 5/2015 | Roh et al. | |
| 2015/0172617 A1 | 6/2015 | Kitajima | |
| 2015/0181182 A1 | 6/2015 | Lin et al. | |

OTHER PUBLICATIONS

European Search Report dated Oct. 6, 2016, in corresponding EU Patent Application No. 15200782.9, filed on Dec. 17, 2015, in the name of Revolution Display, LLC.

Shlayan et al., "Energy Efficient RGBW Pixel Configuration for Light-Emitting Displays." UNLV Faculty Publications, Electrical & Computer Engineering, Journal of Display Technology, vol. 5, No. 11, pp. 418-424 (Nov. 2009).

Brown Elliott et al., "Adding a White Subpixel." Color Rendering, Information Displays pp. 26-31 (May 2005).

Cheng et al., "Five-Primary-Color LCDs." Journal of Display Technology, vol. 6., No. 1, pp. 3-7 (Jan. 2010).

Heckaman et al., "Beyond the Locus of Pure Spectral Color and the Promise of HDR Display Technology." Information Display Jul. 2007, pp. 22-26.

Luka et al., "Colorimetric Image Splitting for High-Dynamic-Range Displays." Munsell Color Science Laboratory, Chester F. Carlson Center for Imaging Science, Rochester Institute of Technology, Rochester, NY (Jan. 1, 2008).

Kang, Henry R., "Computational Color Technology." School of Electrical Engineering and Computer Science, Kyungpook National University, pp. 43-53 (2006).

"PenTile Matrix Family," Wikipedia, https://en.wikipedia.org/wiki/PenTile_matrix_family (Last viewed on Dec. 8, 2015).

Nouvoyance Company, Working with Samsung on Display Matrix, http://www.nouvoyance.com/technology-what.html (Last viewed on Dec. 8, 2015).

Xiong et al., "Performance Analysis of PLED Based Flat Panel Display With RGBW Sub-Pixel Layout." Organic Electronics 10 (2009) pp. 857-862.

Spindler et al., "System Considerations for RGBW OLED Displays." Extended version of paper presented at 2005 SID International Symposium, May 24-27, 2005, Journal of the SID 14/1 (2006).

"Invited Paper: PenTile RGBW® Color Processing," Wiley Online Library at http://onlinelibrary.wiley.com/doi/10.1889/1.3069331/abstract (Last viewed on Dec. 8, 2015).

"Dynamic Wide-Color-Gamut RGBW Display," Wiley Online Library at http://onlinelibrary.wiley.com/doi/10.1889/1.2785590/abstract (Last viewed on Dec. 8, 2015).

Shlayan, et al. "A Novel RGBW Pixel for LED Displays." IEEE Xplore Digital Library, Browse Conference Publications, Systems Engineering (Aug. 2008).

Xu, et al. "Optimization of Subpixel Color Tiles for Mobile Displays." SID Symposium Digest of Technical Papers, vol. 39, Issue 1, pp. 1351-1354 (May 2008).

Nouvoyance Technology, Display Design and the Human Vision System, http://www.nouvoyance.com/technology.html (Last viewed on Dec. 8, 2015).

* cited by examiner

LARGE-FORMAT DISPLAY SYSTEMS HAVING COLOR PIXELS AND WHITE PIXELS

RELATED APPLICATION DATA

This application claims the benefit of priority of U.S. Provisional Patent Application Ser. No. 62/095,038, filed on Dec. 21, 2014, and titled "LARGE-FORMAT DISPLAY SYSTEMS HAVING COLOR PIXELS AND WHITE PIXELS," which is incorporated by reference herein in its entirety.

FIELD OF THE INVENTION

The present disclosure relates to displays, and in particular relates to large-format display systems having color pixels and white pixels.

BACKGROUND

Modern displays such as LCD and LED displays use red (R), green (G) and blue (B) light emitters to generate a color display image. Certain types of displays, including large displays, use R, G, and B light emitters (e.g., diodes) packaged together to define a full-color pixel, with an array of such pixels defining the display. The R, G, and B light emitters are referred to as "sub-pixels" since they collectively define the full-color ("color") pixel, typically referred to as an "RGB" pixel.

Displays that use RGB pixels employ the RGB color model wherein the R, G, and B colors are added in different amounts to produce a wide variety of colors. The specific R, G, and B wavelengths used define a color gamut, which is a representation of the color space that can be produced by the light emitters. The color gamut is used to perform color management for the display.

While R, G, and B light can be used to generate a wide range of colors, in practice it is not the most efficient arrangement for all applications. It turns out that the addition of a white (W) sub-pixel to the R, G, and B sub-pixels to form an RGBW pixel has some advantages. For example, the W sub-pixel can be used to provide enhanced brightness, which allows for reducing the usage of the R, G, and B sub-pixels, which in turn increases the lifetime of the pixels and thus the display. Further, since it takes a certain amount of R, G, and B light to generate white light, it is more efficient to generate the needed amount of white light using only the W sub-pixel. In addition, it also enables the use of perceived picture quality enhancements. This can be, e.g., under the form of what is called "white boost," where extra white is added to RGB to add extra gamma. This mimics the behavior of traditional CRT displays.

Unfortunately, RGBW pixels have some drawbacks, particularly for large-format displays that have dimensions measured in feet. One drawback is that the size of the white sub-pixel needs to be about the same as that for the R, G, and B sub-pixels so that RGBW pixel size is relatively large. Another drawback is that the conventional assumption that a white LED light emitter has greater brightness stability as compared to individual RGB LEDs is actually incorrect and that the color stability of a white LED can be problematic. The human eye is much more perceptive to color differences compared to brightness differences. Consequently, using a white sub-pixel to enhance brightness can exacerbate detrimental color stability issues.

Another drawback relates to displaying video information on the RGBW-pixel display and the amount of signal processing involved. Modern television and video cameras convert optical information into electrical signals. The electronic signals are then digitized, processed and packetized. The digitizing step results in a sharp image that is impervious to noise and other issues. For a display with RGBW pixels, substantial video processing is required for transmission of the digital signal over a digital interface, such as an SDI (serial digital interface), to the RGBW-pixel display. The SDI standard defines a coax cable connection for uncompressed video and also defines the video format in which data is sent in digital format of either 8 or 10 bit words to describe the digital image. Different resolution images run at different data rates but the concept of the video image is the same across the different speeds. Words are sent in a sequential fashion across the interface until an entire image has been sent, creating the image in a classic scanning fashion. The information sent across the SDI interface on a per pixel basis utilizes a luminance and color difference approach embodied in a chroma sub-sampling format. In particular, three words, Y, Cb and Cr, are sent per pixel, wherein Y=Luminance, Cb=Blue Color Difference=B−Y, and Cr=Red Color Difference=R−Y. The various chroma sub-sampling formats are expressed as Y:Cb:Cr, e.g., 4:2:2, and emphasize the transmission of brightness information over color information.

The receiving equipment accepts the stream of information coming from the SDI interface and is required to process the information and modify the data to be able to create a visual display. As most displays have RGB pixels to create an image, the display (video) processor has to take the information sent and turn it into RGB information. Thus, for each RGBW pixel, the amount of white light for the W sub-pixel is based on a calculation of the amount of light emitted by the R, G, and B sub-pixels per the three words Y, Cb, and Cr. An example of this type of calculation is described in the article by Candice H. Brown Elliott et al., entitled "Adding a White Subpixel," *Information Display*, May 2005, pp. 26-31.

SUMMARY

An aspect of the disclosure is a method of forming a large-format color display image to be viewed by the visual system of a human viewer. The method includes: providing a large-format display that includes: a) first pixels each having a first area, with each first pixel comprising a red (R) light emitter, a green (G) light emitter, and a blue (B) light emitter, with each of the R, G, and B light emitters constituting a sub-pixel of the corresponding first pixel; and b) second pixels each having a second area, with each second pixel having at least one white (W) light emitter, wherein the second area is substantially equal to or greater than the first area; sending a digital video signal representative of a color display image to the large-format display through a video processor to form a processed digital video signal, wherein the color display image is based on R, G, B, and W information, and wherein the video processor does not perform a W-to-RGB conversion; and displaying the color display image on the display based on the processed digital video signal.

Another aspect of the disclosure is a large-format color display system for displaying a color display image for viewing by a visual system of a viewer. The system includes: a large-format display that includes: a) first pixels each having a first area, with each first pixel comprising a red (R)

light emitter, a green (G) light emitter, and a blue (B) light emitter, with each R, G, and B light emitter constituting a sub-pixel of the corresponding first pixel; and b) second pixels each having a second area, with each second pixel having at least one white (W) light emitter, wherein the second area is substantially equal to or greater than the first area; a video camera that captures a video color image and forms a digital video signal representative of the video color image based on R, G, B, and W information; a video processor electrically connected to the video camera and the large-format display and that performs processing of the digital video signal to form a processed digital video signal that is provided to the large-format display to form a color display image; and wherein the processing of the digital video signal by the video processor to form the processed video signal does not include performing a W-to-RGB conversion.

Another aspect of the disclosure is a method of forming a large-format color display image to be viewed by the visual system of a human viewer. The method includes: providing a large-format display that includes: a) first pixels each having a first area, with each first pixel comprising a red (R) light emitter, a green (G) light emitter, and a blue (B) light emitter, with each of the R, G, and B light emitters constituting a sub-pixel of the corresponding first pixel; and b) second pixels each having a second area, with each second pixel having at least one white (W) light emitter, wherein the second area is substantially equal to or greater than the first area; sending a digital video signal representative of a color display image to the large-format display through a video processor to form a processed digital video signal, wherein the color display image is based on R, G, B information, and wherein the video processor performs a RGB-to-W conversion; and displaying the color display image on the display based on the processed digital video signal.

Another aspect of the method involves performing color matching using the following steps: a) determining visual response colors $C_V=(R_V, G_V, B_V, W_V)$ and camera response colors $C_{CR}=(R_{CR}, G_{CR}, B_{CR}, W_{CR})$; and b) calculating a set of color differences $\Delta E$ for the visual response colors $C_V$ and the camera response colors $C_{CR}$ for different input colors $C_i$ to determine optimum input colors that result in the set of color differences $\Delta E$ being below a threshold difference $\delta$.

Another aspect of the disclosure is a large-format color display system for displaying a color display image for viewing by a visual system of a viewer. The system includes: a large-format display that includes: a) first pixels each having a first area, with each first pixel comprising a red (R) light emitter, a green (G) light emitter, and a blue (B) light emitter, with each R, G, and B light emitter constituting a sub-pixel of the corresponding first pixel; and b) second pixels each having a second area, with each second pixel having at least one white (W) light emitter, wherein the second area is substantially equal to or greater than the first area; a video camera that captures a video color image and forms a digital video signal representative of the video color image based on R, G, and B colors; a video processor electrically connected to the video camera and the large-format display and that performs processing of the digital video signal to form a processed digital video signal that is provided to the large-format display to form a color display image; and wherein the processing of the digital video signal by the video processor to form the processed video signal performs a RGB-to-W conversion.

Another aspect of the disclosure is a method of forming a large-format color display image to be viewed by the visual system of a human viewer. The method includes: providing a large-format display that includes: a) first pixels each having a first area, with each first pixel comprising a red (R) light emitter, a green (G) light emitter, and a blue (B) light emitter, with each of the R, G, and B light emitters constituting a sub-pixel of the corresponding first pixel; and b) second pixels each having a second area, with each second pixel having at least one white (W) light emitter, wherein the second area is substantially equal to or greater than the first area; sending a digital video signal representative of a color display image to the large-format display through a video processor to form a processed digital video signal; displaying the color display image on the display using the first pixels based on the processed digital video signal; and activating the second pixels to perform a non-video-based lighting effect.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

In the discussion below, red, green, and blue primary colors are used to describe aspects of the disclosure, along with white. The teachings of the disclosure are not limited strictly to these colors, and one skilled in the art understands that other colors can be used to achieve the same effects. For example, orange can be used in place of white, though typically with less efficiency. Magenta, yellow, and cyan can also be used for the colored light emitters, albeit typically with less efficiency.

Figure 1:
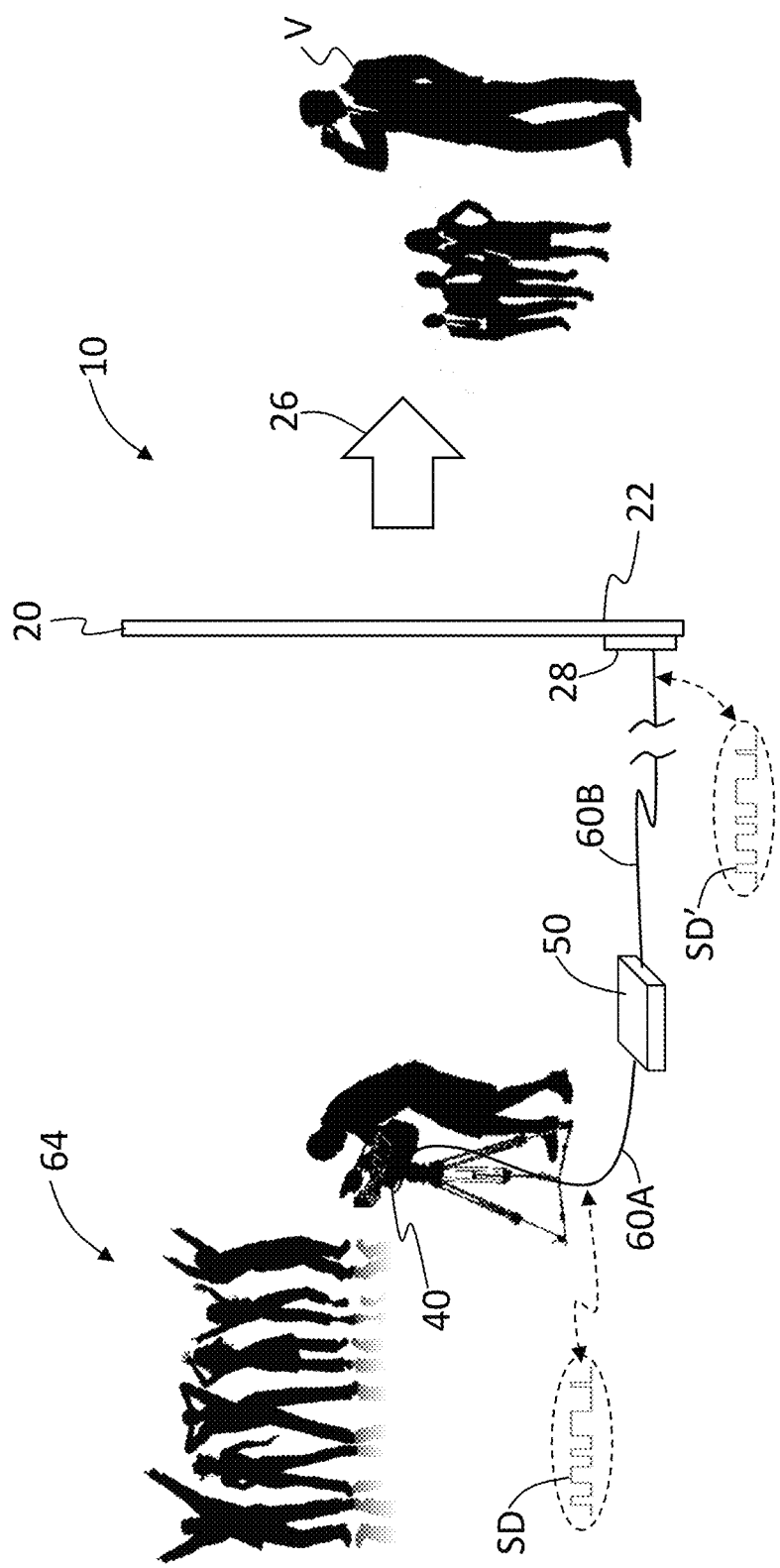
FIG. 1 is a schematic diagram of an example large-format display system according to aspects of the disclosure.

FIG. 1 is a schematic diagram of an example large-format display (LFD) system 10 according to the disclosure. The LFD system 10 includes an LFD 20 that has a front surface 22 that emits a color display image 26, which is shown being viewed by at least one viewer V. The eyes and brain of the viewer V constitute a visual system that receives and processes the color display image 26 to yield the actual color display image the viewer perceives.

The LFD system 10 also includes a video camera 40, and a video processor 50. In an example, video camera 40 is electrically connected to video processor 50 with a first section of electrical cable 60A, and the video processor is electrically connected to LFD 20 by a second section of electrical cable 60B. An exemplary electrical cable for electrical cable sections 60A and 60B is standard coaxial cable (e.g., 801 coaxial cable). In various examples, the electrical connections of the LFD system 10 are configured using a digital interface, such as a serial digital interface (SDI), high-definition SDI (HDSDI), digital video interface (DVI), or a high-definition multimedia interface (HDMI). The video camera 40 is shown capturing an image of a scene 64. The video camera 40 converts the captured image of scene 64 into a digital video signal SD. The digital video signal SD is then processed by video processor 50 as discussed in greater detail below to form a processed digital video signal SD'. The processed digital video signal SD' is then sent to LFD 20, which in response forms the color display image 26. In an example, LFD 20 includes a display electronics unit 28 that receives the processed digital video signal SD' and uses the information embodied therein to manage the activation of light emitters (discussed below) on the LFD to create the color display image. In an example, display electronics unit 28 does not further process the processed digital video signal SD'.

Figure 2:
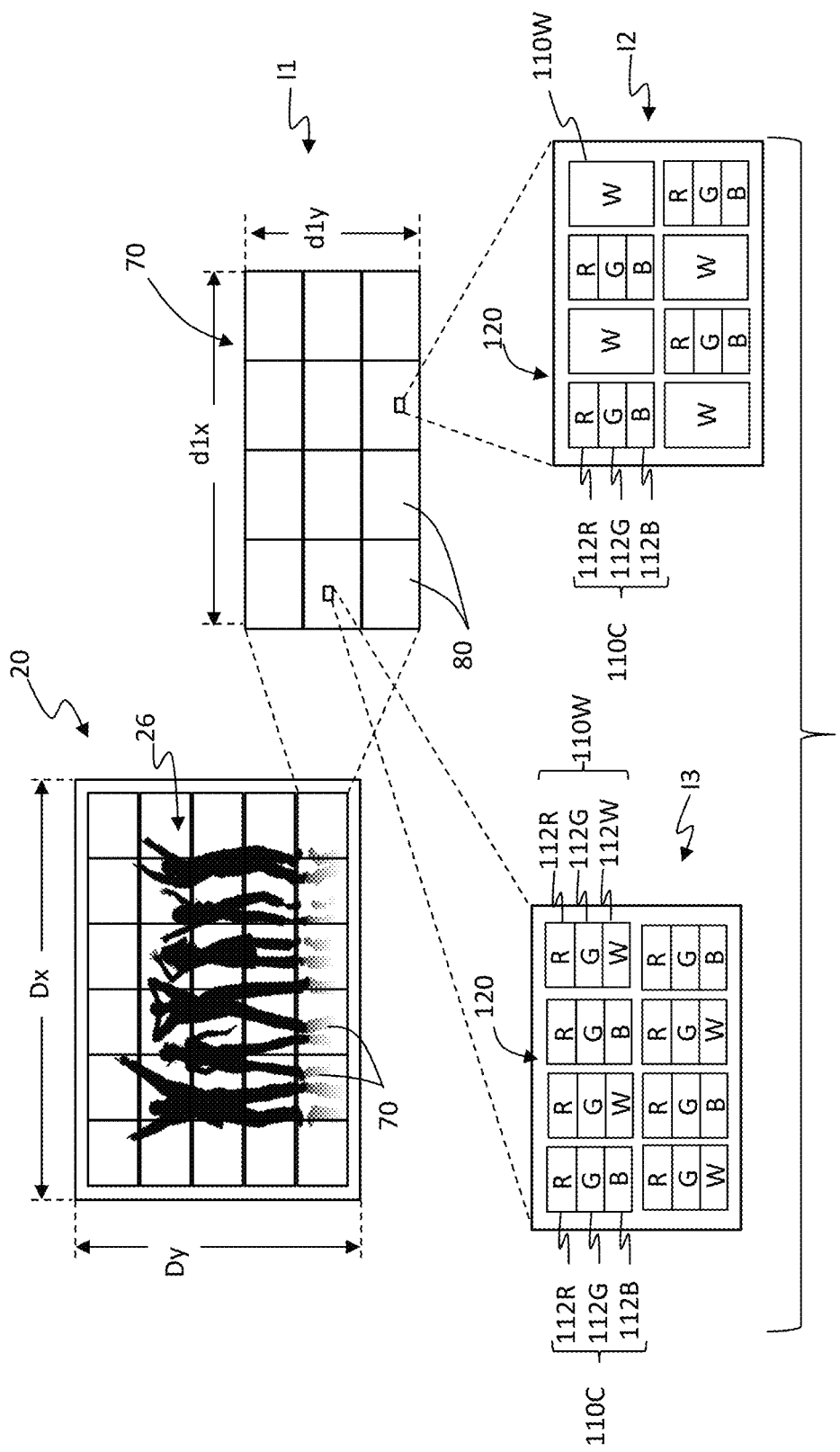
FIG. 2 shows a front-on view of a large-format display of a large-format display system according to aspects of the disclosure and the color display image formed thereby, along with an example configuration of the large-format display that includes panels and modules, and showing the RGB pixels and W pixels that make up the pixel array for each module.

FIG. 2 shows a front-on view of LFD 20 and the color display image 26 formed by the LFD (illustrated in black and white due to limitations of patent drawings). The LFD 20 is shown as comprising a number of display panels ("panels") 70, although it is noted that the 6×5 array of panels is only shown by way of example and other configurations can be used. Each panel 70 may have dimensions d1x×d1y. In an example, the dimension d1x can range from 450 to 500 mm and the dimension d1y can range from 250 to 300 mm. In an example illustrated in the first close-up inset I1, each panel 70 can be made up of a number of display assemblies or "modules" 80, such as the 3×4 array of display modules shown. Each module 80 may have dimensions d2x×d2y. In an example, the dimension d2x can range from 100 mm to 300 and the dimension d2y can range from 80 mm to 300 mm. In an example, the color pixels 110C are separated from the white pixels 110W with a center-to-center spacing in the range from 0.25 mm to 3.5 mm. An exemplary spacing is 0.625 mm. In an example, LFD 20 can have a size that ranges from the size of one module 80 up to tens or many tens of feet.

In an example shown in the second close-up inset I2, each module 80 includes a pixel array 120 made up of color (or RGB) pixels 110C and white pixels 110W. The color pixels 110C each include a red sub-pixel 110R, a green sub-pixel 110G, and a blue sub-pixel 110B. In an example, the red, green, and blue sub-pixels 110R, 110G, and 110B are respectively defined by red, green, and blue light-emitting diodes (LEDs), and the white pixel 110W is defined by at least one white LED. In one example, white pixel 110W consists of either one white LED or multiple white LEDs. In another example illustrated in close-up inset I3, the white pixels 110W can be defined using a red sub-pixel 112R, a green sub-pixel 112G, and a white sub-pixel 112W. With the addition of red and green to the white, one can adjust the color temperature of the total emitted white light and hence adjust the white color differences. Further in this example, not only can the white be adjusted, but in an example extra green and red can also show extra display information, thereby increasing the resolution of LDF 20.

The color pixels 110C and the white pixels 110W may be independently addressable pixels and the white pixels need not be sub-pixels of color pixels 110C. The LFD 20 can also be referred to as an "RGB+W color LFD." In an example, LFD 20 has high-definition resolution, e.g., has 1280×720 total pixels or 1920×1080 total pixels.

In an example embodiment, the color pixels 110C each have an area A1 while the white pixels 110W each have an area A2, wherein $A2 \geq A1$. That is to say, the white pixels 110W are at least as large as the color pixels 110C and can be the same size or larger. In an example, the white pixels 110W are substantially the same size as the color pixels 110C. In an example, color pixels 110C and white pixels 110W have a dimension (e.g., width) in the range from 0.4 mm to 5 mm. Larger dimensions are also possible based on the particular application. In an example, the color pixels 110C and white pixels 110W are each square, while in another example are each rectangular, although various other combinations of square, rectangular, and/or other shapes could be used.

In an example, the colored and white pixels 110C and 110W are arranged in groups or pixel assemblies 120 of m rows and n columns (i.e., m×n) where m and n are integers equal to 2 or greater. In the example shown in FIG. 2, the pixel assembly 120 has a 4×2 configuration. Other configurations include 2×2, 3×2, etc. The pixel assemblies 120 have an alternating or checkerboard configuration of color pixels 110C and white pixels 110W.

The use of separate white pixels 110W contributes substantially to power savings. Below is a power consumption calculation based on standard available LEDs with typical specifications as set forth in Table 1, where mcd=millicandelas. Note also that the unit of brightness used below is the "Nit," wherein 1 Nit=1 $cd/m^2$.

TABLE 1

Example LED output and color data

| COLOR | OUTPUT | COLOR COORDINATES |
|---|---|---|
| RED | 77 mcd @ 10 mA | (0.700; 0.299) |
| GREEN | 160 mcd @ 5 mA | (0.189; 0.718) |
| BLUE | 40 mcd @ 5 mA | (0.133; 0.075) |
| WHITE | 125 mcd @ 5 mA | (0.464; 0.409) |

In the above example, the color of white is taken very warm. This is because over the range of 3200K to 9300K display white, the power consumption is always within the same range of +/−20% (red will otherwise become the limiting factor). Also note that for this example, the white brightness (output) is deliberately lower than green. In typical calculations, the white is usually more efficient and so has greater light output as compared to green. However, the relatively low white brightness is used herein to provide a conservative estimate.

The total power for LEDs (5V) needed at 1400 Nit with D65 white is 77.53 W for RGB, while the total power for LEDs (5V) needed at 1400 Nit with D65 white is 64.77 W for RGBW. Thus, a conservative estimate of the power savings is 16%; even greater power savings can be expected when the output of the white pixels 100W is greater. The reduced power consumption leads to additional savings because the cooling system used to carry away heat generated by the LEDs can be less complex and thus less expensive.

The use of separate white pixels 110W also results in a substantial cost savings for the LFD 20. For example, in the 4×2 pixel configuration shown in the inset I2 of FIG. 2, only 16 total LEDs (dies) are used instead of 24 total LEDs, which represents a 33% reduction in LED cost. This also leads to a corresponding reduction in the cost of the constant-current drivers that generate the PWM (pulse-width modulated) signals provided to the LEDs. Given that the reduction in resolution of LFD 20 by using separate white pixels 110W is only about 5%, the cost-saving benefits are substantial. Further, the addition of white into the color spectrum results in better color rendering.

In many if not most types of lighting and display devices, there is a relatively tight tolerance on the white color (i.e., it has to be in a very narrow bin) in order to avoid seeing individual color differences. This issue can be avoided in LFD system 10 by calibrating all colors to a fixed point by adding the correct amount color, e.g., red, green, or blue, to the specific white color to obtain the desired color point. This expansion of the calibration of the LFD 20 has an added benefit in that instead of focusing on the perfect white color, the tolerances on the white color can be reduced, so that the cost of the white LED can be even lower than the standard white LED configurations used in conventional light.

It is known in the art that the white color is 90% of the perceived resolution of a display. This is the main reason why transmission formats for television and video emphasize brightness (black and white) over the color components, e.g., in the aforementioned chroma sub-sampling format (e.g., 4:2:2 format) where the brightness or luminance component is twice the chroma or color components.

With reference again to FIGS. 1 and 2, in the operation of LFD system 10, video camera 40 captures a color image of scene 64 and generates a digital video signal SD representative of the captured image. The digital video signal SD from the video camera 40 travels to the video processor 50. In an example, the digital video signal SD includes color information as well as "white" or brightness information. Any one of the known signal formats or protocols (e.g., 4:2:2, 4:4:4, 4:1:1 and 4:2:0) can be used for the digital video signal.

As discussed above, the conventional methods would require that the video processor 50 process the digital video signal SD so that the output of the white pixel 110W is defined in terms of the color information for the R, G, and B sub-pixels 110R, 110G, and 110B of the color pixels 110C to integrate or combine the color pixels and white pixels to make for a more visually acceptable display to the viewer V. This process is referred to herein as "W-to-RGB conversion." This could also be referred to as "white-to-color conversion."

In LFD system 10, the video processor 50 can perform the usual processing of the RGB colors for the color pixels 110C but does not perform the W-to-RGB conversion when forming processed digital video signal SD'. The information for the white pixels 110W thus goes straight to the one or more modules 80 and to the white pixels supported thereby. As a consequence, the LFD 20 does not have the color pixels 100C and white pixels 100W integrated or combined. This means that the LFD does not, strictly speaking, have particularly good display qualities, i.e., the physical LFD 20 display is not optimized because the LFD has a checkerboard of RGB+W pixels that would normally be considered problematic in practice.

However, LFD system 10 relies on the visual system of viewer V to perform the W-to-RGB conversion that would normally take place in the video processor 50. This conversion performed by the viewer V relies on the non-linear response of the eye to form combined RGBW pixels from the separate color pixels 110C and white pixels 110W. By relegating the W-to-RGB conversion to the visual system of the viewer V, the processing of the digital video signal is greatly simplified. In particular, there is less white pixel information when this information is sent straight to the LFD 20 as compared to converting this information into RGB information.

In another example of the operation of LFD system 10, video camera 40 captures a color image of scene 64 and generates a digital video signal SD representative of the captured image, wherein the digital video signal does not include separate white information, e.g., it includes only R, G, and B information. In this case, the video processor 50 or the display electronics unit 28 can be configured to perform an "RGB-to-W conversion" to separately define white information in processed digital video signal SD'. This processed digital video signal SD' is then used to form the display image 26 according to the methods disclosed herein.

The use of relatively large white pixels 110W allows for LFD 20 to be used as a luminaire or to provide both video and luminaire capability. For example, the video capability can be used to create visual effects while the luminaire capability can be used for lighting, photography, and other illumination effects and like functions. Thus, in an example, the white pixels 110W need not be activated through a video channel but may be activated in a completely separate channel for lighting, illumination effects, and like functions. In other words, the white pixels 110W can be used to perform a non-video-based lighting effect via a non-video channel.

In an example, white pixels 110W are used to perform the aforementioned "white boost" to add an extra white peak to the LFD system 10. White boost is performed by not subtracting the white common factor from the R, G, and B colors. This improves the perceived visual picture quality.

In another example, the original R, G, and B colors are "morphed" based on subtracting white from these colors. In an example method, it is assumed that white remains white at full intensity, and that the colors may not be de-saturated by the addition of white so that the color relationships are maintained.

In an example, a "distance" d between the individual colors is introduced based on for example an 8-bit space (d has 0 to 255 scale). If the distance d between the colors individually is 0, it means that R=G=B=W. In this case, white may not be subtracted from the original R, G, and B component. If the distance d is 255, there is a saturation in colors (i.e., at least one color is not showing), in which case the white factor can be completely subtracted from the original R, G, and B component.

All of the spaces between distances d 0 and 255 are "morphed" based on the formula $(RGB)_M = (RGB)_O - A \cdot (W)$, where $(RGB)_M$ stands for the morphed RGB colors, $(RGB)_O$ stands for the original RGB colors, and A is a multiplying factor based on the distance d. If the maximum distance is 0, then A must be zero, and if the maximum distance is 255, then A must be 1; thus, A=d/255. The morphing calculation can be performed in the video processor 50 (which in an example can include a field-programmable gate array or FPGA) without introducing substantial delay or difficult clock divisions.

In another example, LFD system 10 is used to provide improved color rendering, i.e., to provide a relatively high color-rendering index or CRI as compared to conventional displays. The CRI is a value between 0 and 100, where 100 indicates a perfect illuminator, such as the sun. RGB lighting can be used to form a display with a CRI of about 75. The addition of white allows for color tuning so that the CRI of the display can be increased to about 95. Improving the CRI enables the LFD system 10 to be used as high-quality lighting device.

In an example, LFD system 10 is configured to substantially if not optimally match the color rendering for the human visual system ("visual color rendering") to the color rending of an image-capture device such as a TV camera or video camera ("camera color rendering"). Such matching is desirable in situations where LFD display 20 is to be imaged by a camera and then viewed or where the display is to be both viewed directly as well as viewed as part of a camera image. These situations occur when LFD display 20 is in the background of a film set or is part of the scene of a televised or recorded event. Camera sensitivities are not matched very well to conventional RGB displays so that displays look very different when viewed as a camera or video image as compared to the display's actual visual appearance. In many instances, the difference in visual color rendering and the camera color rendering is not only noticeable but can be extremely distracting. To offset this dissonance in color rendering, the RGB display is usually altered so that its appearance on camera is acceptable even though its actual visual appearance when viewed live by the human visual system is unacceptable.

The LFD system 10 disclosed herein solves this problem without having to make the display color unappealing. The use of the separate white pixels 110W in combination with the R, G, and B pixels 110R, 110G, and 110B allows for colors to be substantially or optimally matched to both the camera response and the human visual system response.

A particular color in an RGB color gamut is defined by its RGB values, denoted (R, G, B). For example, in an 8-bit RGB color system with color values or multiplication factors (R, G, B) between 0 and 255, the color red is defined by (255, 0, 0) while white is defined by (255, 255, 255). The addition of the white pixel 110W adds another degree of freedom so that the RGBW color system is defined by four color values (R, G, B, W). In this RGBW color system, white can be defined by (0, 0, 0, 255), (255, 255, 255, 0), (255, 255, 255, 255), or (127, 127, 127, 127). Generally, different combinations of R, G, B, and W can be used to define a given color.

To optimize both visual color rendering and camera color rendering, the color values are selected so that the visual color rendering and the camera color rendering substantially match, e.g., the difference between the two color renderings are minimized. This involves knowing or measuring the camera color response CR. The human visual response (HVR) is known. The difference in the visual and camera color renderings can be characterized by the color difference $\Delta E$, which is a measure of the difference between two colors in a color space. The $\Delta E$ values can be calculated for a given set of colors.

Figure 3A:
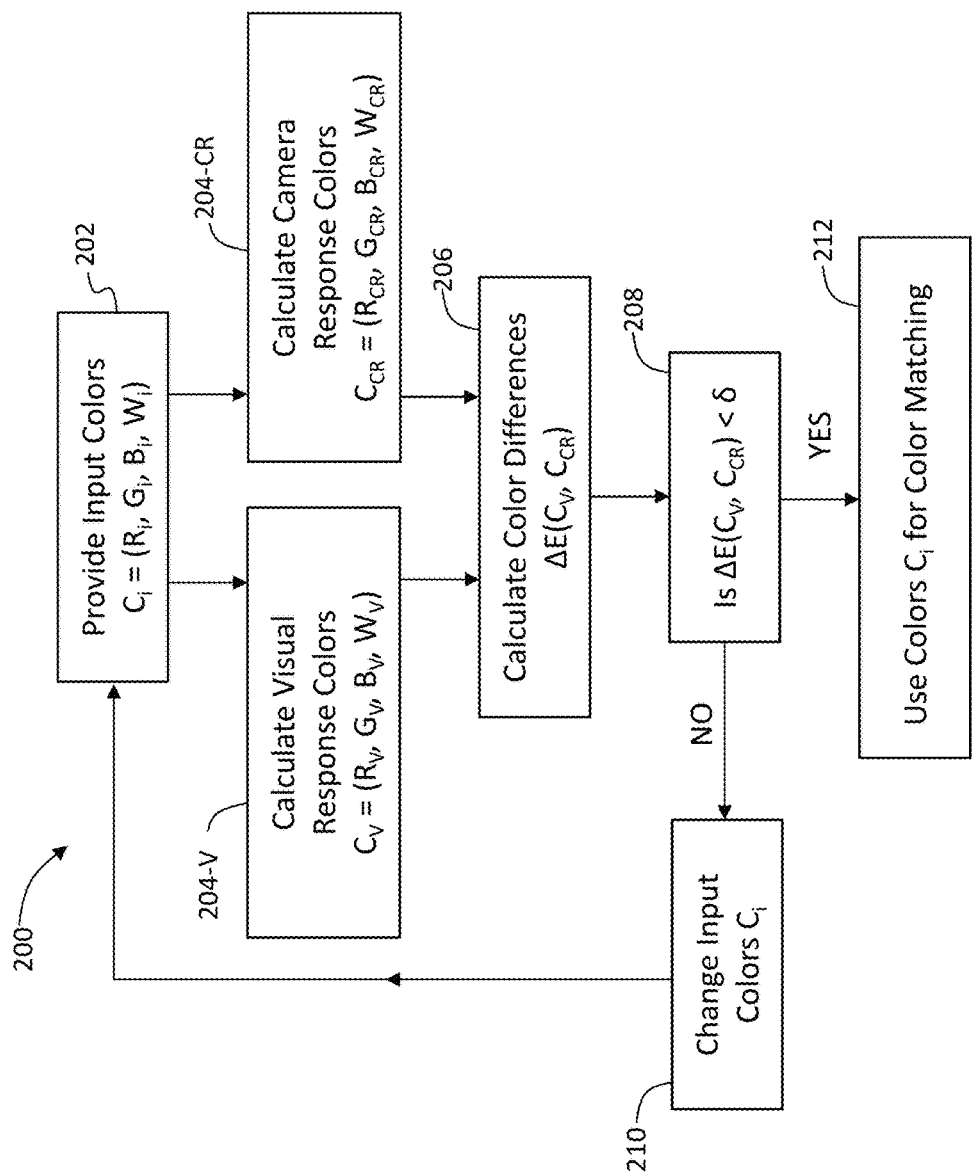
FIGS. 3A and 3B are flow diagrams illustrating example methods of performing color matching between the direct visual color image from the large-format display and a camera color image of the large-format display.

FIG. 3A is a flow diagram 200 that illustrates an example method of determining optimum color values $C_O = (R_O, G_O, B_O, W_O)$ that minimize the difference between the visual color rendering and camera color rendering to within a threshold amount $\delta$. In step 202, an initial set of input colors $C_i = (R_i, G_i, B_i, W_i)$ is provided. In step 204-V, the input colors $C_i$ are processed with a "visual" response associated with directly viewing LFD system 10 to determine (calculate) a set of visual response colors $C_V = (R_V, G_V, B_V, W_V)$ associated with viewing LFD 20 directly. The visual response colors $C_V$ can also be referred to as "display response colors," referring to the fact that the colors are what a viewer sees when viewing the display directly rather than via camera 40.

Meanwhile, in step 204-CR, the set of input colors $C_i$ is processed using the known or measured camera response CR to determine (calculate) a set of camera response colors $C_{CR} = (R_{CR}, G_{CR}, B_{CR}, W_{CR})$ associated with viewing LFD 20 through camera 40. In the next step 206, the visual response colors $C_V$ and the camera response colors $C_{CR}$ are then used to calculate a set of color differences $\Delta E$. This process is denoted $\Delta E\ (C_V, C_{CR})$.

At step 208, set of color differences $\Delta E\ (C_V, C_{CR})$ are compared to the aforementioned threshold amount $\delta$, which represents the difference between the visual color rendering and the camera color rendering. It is noted here that the threshold amount $\delta$ can vary based on the particular colors being compared since it may be that certain colors are more important than others in achieving a satisfactory color match.

If the set of color differences $\Delta E\ (C_V, C_{CR})$ is not less than the threshold amount $\delta$, then the method proceeds to step 210, which changes the input colors $C_i$. The method steps 202 through 208 as described above are then repeated with the changed input colors $C_i$. If the comparison in step 208 indicates that the set of color differences $\Delta E\ (C_V, C_{CR})$ is less than the threshold amount $\delta$, then the method proceeds to step 212, wherein the input colors $C_i$ that resulted in a positive ("YES") result in step 208 are identified as the colors to be used for performing color matching, i.e., for having an acceptable (and optionally a minimum) difference between the visual color rendering and camera color rendering. In particular, LFD system 10 is configured using the color-matched colors $C_i$ of step 212. The method can be performed using illuminant C or CRI color references.

Figure 3B:
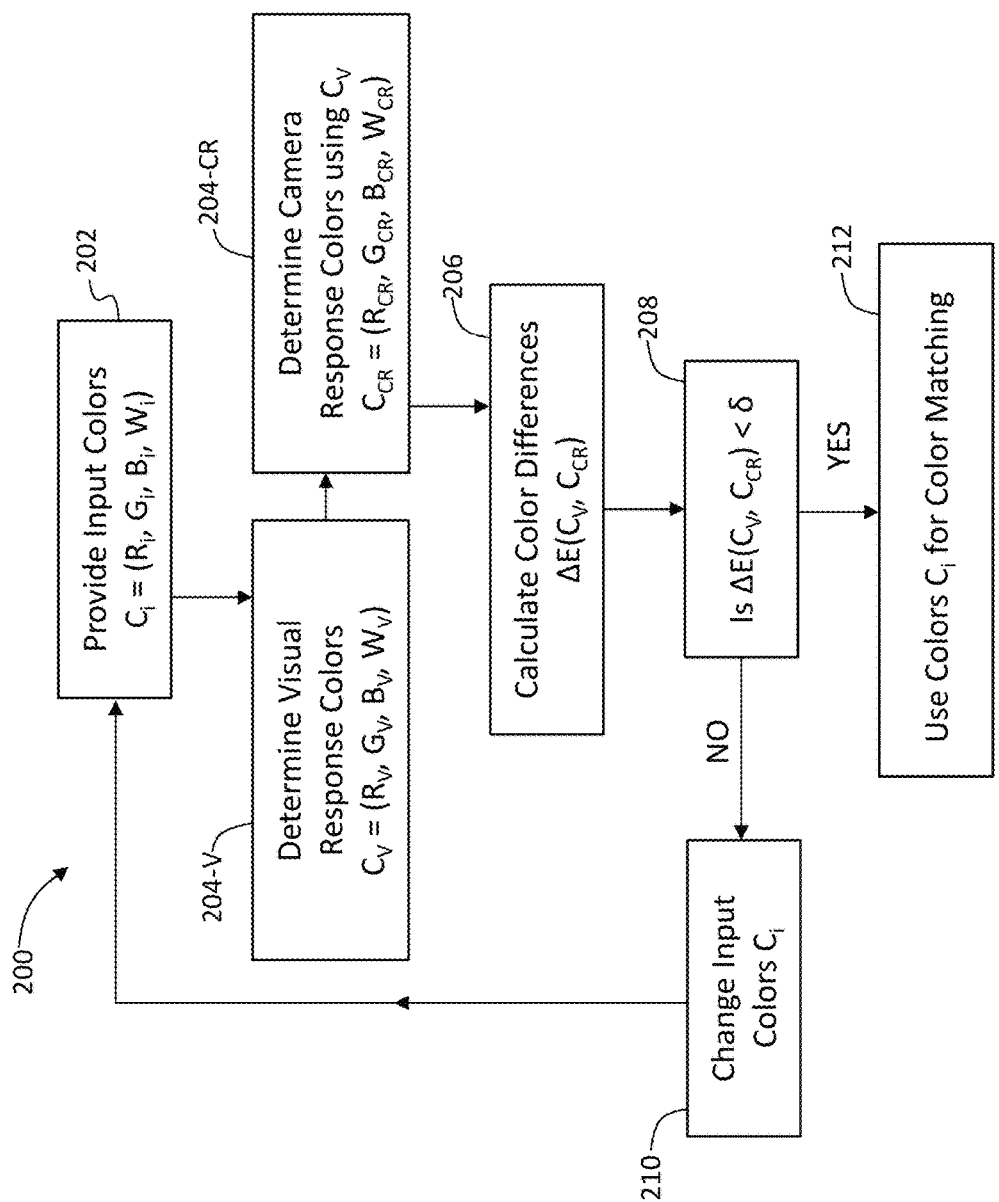
Figure 4:
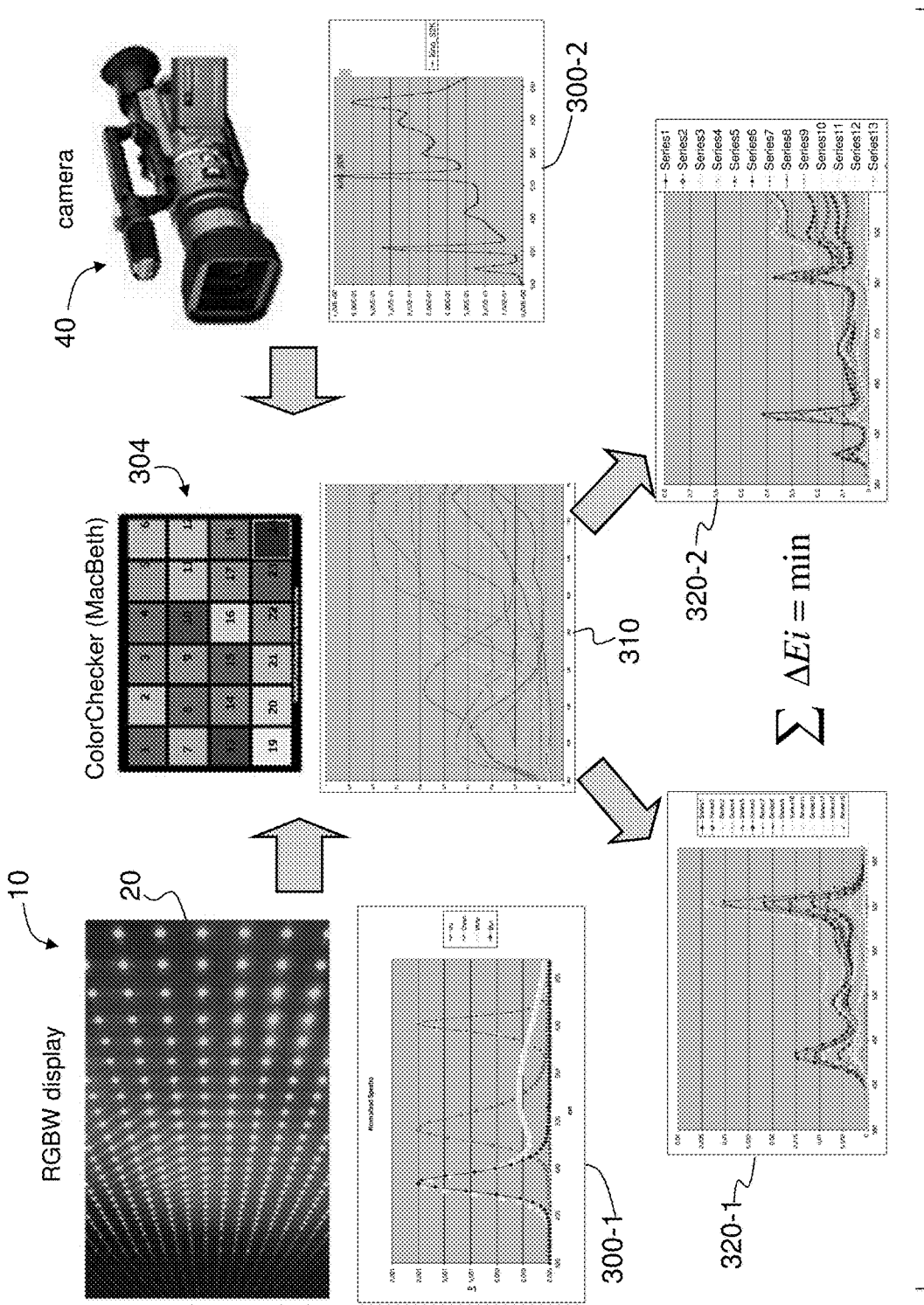
FIG. 4 is an example flow diagram of the example color-matching method of FIG. 3B, wherein the flow diagram includes various spectra associated with the different method steps.

FIG. 3B is a flow diagram similar to FIG. 3A and illustrates an example wherein the camera response colors $C_{CR}$ are determined based on the visual response colors $C_V$. FIG. 4 is an example flow diagram of the color-matching method of FIG. 3B. The flow diagram of FIG. 4 includes various spectra associated with the different method steps; in particular, response diagrams 300-1 and 300-2 for the LFD system 10 and for camera 40, respectively, are shown. In the example method, a color reference 304, such as a COLOR-CHECKER® color chart from MacBeth or like color chart, is used to establish the $\Delta E$ data. The plot 310 includes the (normalized) spectral reflection values of the individual colors of the color reference 304 based on illuminating the color reference with light from LFD 20. The spectral responses of plot 310 represent display or visual response colors $C_V$. These spectral responses are processed by the camera response (either directly or via a calculation based on the known camera response) to obtain the camera response colors $C_{CR}$. At this point, $\Delta E(C_V, C_{CR})$ is calculated, then minimized by the operation $\Sigma \Delta E_i$=min. The resulting colors $C_i$ from the minimizing operation are used for LFD system 10. The resulting color matching is shown in plots 320-1 and 320-2 for the LFD system 10 and camera 40, respectively, and the quality of the color matching is reflected in the similarity of the two plots.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of forming a color display image to be viewed by the visual system of a human viewer, comprising:
   providing a display that includes: a) first pixels each having a first area, with each first pixel comprising a red (R) light emitter, a green (G) light emitter, and a blue (B) light emitter, with each of the R, G, and B light emitters constituting a sub-pixel of the corresponding first pixel; and b) second pixels each having a second area, with each second pixel having at least one white (W) light emitter, wherein the second area is substantially equal to or greater than the first area;
   sending a digital video signal representative of a color display image to the display through a video processor to form a processed digital video signal, the processed digital video signal including a first pixel signal for controlling the first pixels and a second pixel signal that is different than the first pixel signal for controlling the second pixels, wherein the color display image is based on R, G, B, and W information, and wherein the video processor performs at least one of a W-to-RGB conversion or RGB-to-W conversion to form one of the first and second pixel signals and does not perform a W-to-RGB conversion or RGB-to-W conversion for the other one of the first and second pixel signals; and
   displaying the color display image on the display based on the processed digital video signal.

2. The method according to claim 1, wherein the second pixels are white pixels, further wherein each white pixel consists of either a single W light emitter or multiple W light emitters.

3. The method according to claim 1, wherein the second pixels are white pixels, further wherein each white pixel consists of an R light emitter, a G light emitter, and a W light emitter.

4. The method according to claim 3, wherein the white pixels emit white light having a color temperature and the method further includes adjusting the light output of the R light emitter and the G light emitter to adjust the color temperature.

5. The method according to claim 1, wherein sending the video signal includes transmitting the video signal over a digital interface selected from the group of digital interfaces comprising: a serial digital interface (SDI), a high-definition SDI (HDSDI), a digital video interface (DVI), and a high-definition multimedia interface (HDMI).

6. The method according to claim 1, wherein the video signal has a sampling format selected from the group of sampling formats comprising: 4:2:2, 4:4:4, and 4:2:0.

7. The method according to claim 1, wherein the first area is equal to the second area.

8. The method according to claim 1, wherein the first and second pixels are arranged in pixel assemblies that include at least two first pixels and at least two second pixels in a checkerboard configuration.

9. The method according to claim 8, wherein the pixel assemblies have m rows and n columns to define an m×n configuration, wherein m=2, 3, or 4 and n=2.

10. The method according to claim 1, wherein the first and second pixels each have a width in the range from 0.4 mm to 5 mm and are spaced apart by a distance in the range from 0.25 mm to 3.5 mm.

11. The method according to claim 1, wherein the display is a large-format display is made up of one or more modules, wherein each module has a horizontal dimension in the range from 100 mm to 300 mm and a vertical dimension in the range from 80 mm to 300 mm.

12. The method according to claim 1, including performing color matching so that the color display image is color matched to a camera having a camera response, wherein the camera response is a response of the camera when the camera captures an image of the color display image being displayed by the display.

13. The method according to claim 12, wherein performing the color matching includes:
   a) determining visual response colors $C_V=(R_V, G_V, B_V, W_V)$ of a person directly viewing the color display image displayed by the display and camera response colors $C_{CR}=(R_{CR}, G_{CR}, B_{CR}, W_{CR})$ associated with the camera response; and
   b) calculating a set of color differences $\Delta E$ for the visual response colors $C_V$ and the camera response colors $C_{CR}$ for different input colors $C_i$ to determine optimum input colors that result in the set of color differences $\Delta E$ being below a threshold difference $\delta$.

14. A large-format color display system for displaying a color display image for viewing by a visual system of a viewer, comprising:

a large-format display that includes: a) first pixels each having a first area, with each first pixel comprising a red (R) light emitter, a green (G) light emitter, and a blue (B) light emitter, with each R, G, and B light emitter constituting a sub-pixel of the corresponding first pixel; and b) second pixels each having a second area, with each second pixel having at least one white (W) light emitter, wherein the second area is substantially equal to or greater than the first area;

a video camera that captures a video color image and forms a digital video signal representative of the video color image based on R, G, B, and W information;

a video processor electrically connected to the video camera and the large-format display and that performs processing of the digital video signal to form a processed digital video signal that is provided to the large-format display to form a color display image, the processed digital video signal including a first pixel signal for controlling the first pixels and a second pixel signal that is different than the first pixel signal for controlling the second pixels; and wherein the processing of the digital video signal by the video processor to form the processed video signal includes performing a W-to-RGB conversion or RGB-to-W conversion to form one of the first and second pixel signals and not performing a W-to-RGB conversion or RGB-to-W conversion for the other one of the first and second pixel signals.

15. The large-format color display system according to claim 14, wherein the second pixels are white pixels, further wherein each white pixel consists of either a single W light emitter or multiple W emitters.

16. The large-format color display system according to claim 14, wherein the second pixels are white pixels, further wherein each white pixel includes an R light emitter, a G light emitter, and a W light emitter.

17. The large-format color display system according to claim 14, wherein the electrical connection between the video camera, the video processor, and the large-format display includes a digital interface selected from the group of digital interfaces comprising: a serial digital interface (SDI), a high-definition SDI (HDSDI), a digital video interface (DVI), and a high-definition multimedia interface (HDMI).

18. The large-format color display system according to claim 14, wherein the digital video signal has a sampling format selected from the group of sampling formats comprising: 4:2:2, 4:1:1, 4:4:4, and 4:2:0.

19. The large-format color display system according to claim 14, wherein the first area is equal to the second area.

20. The large-format color display system according to claim 14, wherein the first and second pixels are arranged in pixel assemblies that include at least two first pixels and at least two second pixels in a checkerboard configuration.

21. The large-format color display system according to claim 20, wherein the pixel assemblies have m rows and n columns to define an m×n configuration, wherein m=2, 3, or 4 and n=2.

22. The large-format color display system according to claim 14, wherein the first and second pixels each have a dimension in the range from 0.4 mm to 5 mm, and wherein the first and second pixels are spaced apart by a distance in the range from 0.25 mm to 3.5 mm.

23. The large-format color display system according to claim 14, wherein the large-format display is made up of one or more modules, wherein each module has a horizontal dimension in the range from 100 mm to 300 mm and a vertical dimension in the range from 80 mm to 300 mm.

24. The large-format color display system according to claim 14, wherein the color display image is color-matched to a camera response of a camera.

* * * * *